(12) United States Patent
Russell

(10) Patent No.: US 7,425,268 B2
(45) Date of Patent: Sep. 16, 2008

(54) DEVICE AND RELATED METHODS FOR PURIFYING A LIQUID

(76) Inventor: John A. Russell, 23316 Redmond-Fall City Rd., Mail Box 481, Redmond, WA (US) 98053

( * ) Notice: Subject to any disclaimer, the term of this patent is extended or adjusted under 35 U.S.C. 154(b) by 0 days.

(21) Appl. No.: 11/331,654

(22) Filed: Jan. 13, 2006

(65) Prior Publication Data
US 2006/0243663 A1 Nov. 2, 2006

Related U.S. Application Data

(60) Provisional application No. 60/676,039, filed on Apr. 29, 2005.

(51) Int. Cl.
*C02F 3/06* (2006.01)
(52) U.S. Cl. .............. 210/617; 210/618; 210/747; 210/150; 210/167.22; 210/167.25; 210/170.02; 210/788; 210/512.1
(58) Field of Classification Search ............. 210/150, 210/151, 167.22, 167.25, 170.02, 266, 304, 210/512.1, 617, 618, 631, 747, 788, 806
See application file for complete search history.

(56) References Cited

U.S. PATENT DOCUMENTS

| | | | | |
|---|---|---|---|---|
| 3,291,309 A | * | 12/1966 | Hutchison | 210/151 |
| 3,966,599 A | * | 6/1976 | Burkhead | 210/151 |
| 4,009,099 A | * | 2/1977 | Jeris | 210/151 |
| 4,141,824 A | * | 2/1979 | Smith | 210/266 |
| 4,869,815 A | * | 9/1989 | Bernard et al. | 210/151 |
| 4,985,182 A | * | 1/1991 | Basse et al. | 210/150 |
| 5,211,844 A | * | 5/1993 | Hattori et al. | 210/151 |
| 5,391,294 A | * | 2/1995 | Mercier | 210/151 |
| 5,584,991 A | * | 12/1996 | Wittstock et al. | 210/170.02 |
| 5,618,411 A | * | 4/1997 | Donner et al. | 210/617 |
| 5,705,057 A | * | 1/1998 | Hoffa | 210/150 |
| 6,447,675 B1 | * | 9/2002 | James | 210/167.22 |
| 6,461,501 B1 | * | 10/2002 | Porter | 210/170.02 |

OTHER PUBLICATIONS

Vortex Microstrainer, Misc. Filters - W. Lim Corp; HTTP://www.wlimproducts.com/vtx-m.htm.
Savio Livingponds Filter; Operating Manual & Specification; Savio Excellence F100 F200, pp. 1-16.
Vortex Filters; http://www.hendersons.co.uk/filtration/page 2.html.
Koi.com - Filtration Systems: Hydra Vortex Sytems; http:/www.koi.com/filtration/hydra-vortex-filters.php.
Aquatic Eco-Systems: Living Pond Filter; http://www.aquaticeco.com/subcategories/1794/Living Pond-filter.

* cited by examiner

*Primary Examiner*—Christopher Upton
(74) *Attorney, Agent, or Firm*—Joshua King; Graybeal Jackson Haley LLP

(57) ABSTRACT

In an aspect of the invention, a device for purifying water in a water water garden or fish pond comprises a filter medium configured to clean the water flowing through the device, and a housing configured to contain the filter media. The housing includes a wall configured to whirl the water flowing through the device to remove suspended particulates from the flow. Liquid flows into the housing, is turned by the wall to whirl the water about an axis, and exposed to elements held by the filter medium for cleaning the liquid. The liquid then flows out of the housing. Cleaning the medium is performed by opening a drain port and adding water to the chamber.

25 Claims, 3 Drawing Sheets

DEVICE AND RELATED METHODS FOR PURIFYING A LIQUID

CROSS-REFERENCE TO RELATED APPLICATIONS

This application claims priority from commonly owned U.S. Provisional Patent Application 60/676,039, filed 29 Apr. 2005, and titled Back Flushable Waterfall Filter and Systems and Methods Related Thereto, presently pending, which are incorporated herein by reference in their entirety and for all their teachings and disclosures.

BACKGROUND

Many residential and commercial properties include an aquatic ecosystem, such as an aquarium or a pond, to be enjoyed by those residing or working at the property. Often, the aquatic ecosystem includes fish or other marine life. To allow the fish and other marine life to thrive and to keep the ecosystem's water fresh, the water must be frequently purified or replaced. If the aquarium or the pond is small, then the dirty water is often removed and discarded, after which clean, fresh water is added. If the aquarium or pond is large, then the aquarium or pond typically includes a system to purify the dirty water. With the system, the dirty water is not discarded. Instead, the dirty water is purified and then circulated back into the aquarium or the pond.

An example of a conventional system 10 that purifies water for an aquarium or a pond is shown in FIG. 1. The system 10 includes a filter 12 to remove particulates and organic waste, and a pump 14 to circulate water through the filter 12. The system 10 also include pipes 16 that contain the water of the aquarium (not shown) or pond (not shown) as the water flows through the pump 14 and filter 12, and circulates back toward the tank (not shown) of the aquarium or the basin (not shown) of the pond. The filter 12 is disposed in a housing 18 without a drain port and includes a matting material 20 to trap particulates suspended in the water, and a layer of rocks 22 to hold bacteria that converts harmful components of organic waste, such as ammonia, into useful compounds, such as nitrate—a plant fertilizer. As water flows around individual rocks 22, the bacteria consume the harmful components suspended in the water and generate nitrate. In operation, the pump 14 draws water from the tank or basin into the pipe 16. The pump 14 then forces the water through the pipe 16 and into the housing 18. The water flows up through the matting material 20, then through the layer of rocks 22, and then over the ledge 24 and into the tank or basin.

Unfortunately the filter 12 requires frequent cleaning, which is time consuming, to keep it operating efficiently. The matting material 20 clogs with particulates that it removes from the water, and the bacteria in the layer of rocks 22 multiply quickly and clog the spaces between individual rocks 22 that the water flows through. To clean the matting material 20 and the layer of rocks 22, one first drains soiled water from within the filter 12 back into the aquarium or pond by reversing the direction of water flow through the pipe 16, then removes both the matting 20 and layer of rocks 22 from the housing 18. One can then either discard the dirty matting material and replace it with new matting material 20, or clean it by running water through it, typically in a direction opposite to the flow of the aquarium or pond's water. Next, one can clean the individual rocks 22 by exposing each rock to a jet of water. Then, to reassemble the filter 12 in the housing 18, clean matting material 20 is inserted into the housing 18, clean rocks 22 are layered above the matting material 20, and bacteria is added to the layer of rocks 22.

Thus, there is a need for device, methods, systems, etc., that efficiently purify water in water garden-type aquatic ecosystem and is easier to clean. The present devices and methods, etc., provide these or other advantages.

SUMMARY

In an aspect of the invention, a device for purifying water in a water garden, or fish pond, comprises a filter medium configured to clean the water flowing through the device, and a housing configured to contain the filter media. The housing includes a wall configured to whirl the water flowing through the device to remove from the flow suspended particulates, such as waste from fish or any other solid matter. Water flows into the housing, is turned by the wall to whirl the water about at least one axis, and exposed to cleaning elements held by the media for cleaning the water. The water then flows out of the housing.

By whirling the water flowing through the device, particulates suspended in the flow are thrown toward the wall where the water flows slower because of friction with the wall's surface. As the particulates enter the slower flow, gravity pulls them out of the flow. Some of the particulates might even contact the wall and be further slowed down by friction with the wall's surface. Thus, particulates are removed from the flow of water without the use of filter material that traps suspended particulates. Consequently, the device has less filter material that can clog and require cleaning. And, as discussed elsewhere herein, in some embodiments of the device, the device may be cleaned without having to remove the filter media.

In some embodiments of the invention, the wall defines a chamber of the device and circulates the flow of water around an axis of the chamber. For example, the chamber may be cylindrical and the water may enter the chamber flowing in a direction that is substantially perpendicular to a radius of the chamber at that location. As the wall turns the flow, the wall directs it into a substantially circular flow that revolves about an axis of the chamber. The flow may revolve about the axis to make less than one complete revolution, or to make one complete revolution, or to make more than one complete revolution.

In some embodiments of the invention, the device includes a trap configured to collect the particulates removed from the flow. For example, the wall may define a cylindrical chamber, and the housing may include a cone extending from the bottom of the cylindrical chamber that holds the particulates removed from the flow of liquid. A port may be located at the bottom of the cone that one can open to remove the particulates from the trap. To clean the trap, one opens the port, adds liquid to the chamber, and allows some or all of the liquid to drain through the port and carry the particulates out of the tap.

In some embodiments of the invention, the filter media has a large specific-surface-area (SSA) component and is configured to convert organic waste into nitrate. For example, the filter media may have an SSA greater than $250\ \text{ft}^2/\text{ft}^3$, such as $366\ \text{ft}^2/\text{ft}^3$, and holds bacteria that converts organic waste into nitrate. The filter media may also float, which can be advantageous in embodiments of the device where the liquid flows through the media after particulates are removed from the flow. By floating, the device does not require a net or constraint to keep the filter media out of the flow as it is turned and particulates are thrown toward the wall. Thus, the liquid can more easily flow through the device.

In another aspect of the invention, a method for purifying a liquid comprises a) directing a flow of liquid into a chamber of a device, b) turning the flow in the chamber to remove suspended particulates from the flow, c) containing filter media in the chamber, and d) cleaning the flowing liquid with the filter media. Turning the flow may occur before or after the filter media cleans the flow. If the flow is turned before the filter media cleans it, however, the filter media is less likely to also trap suspended particulates and thus more likely to remain unclogged.

In some embodiments of the invention, a method for cleaning the device comprises cleaning the filter media while the media remains contained in the device. For example, cleaning the filter media may include directing a second flow of liquid toward the filter media and through the exit of the device before the second flow contacts the filter media.

DETAILED DESCRIPTION

One aspect of the invention provide a water garden filter device that purifies water in a water garden, or fish pond, comprises a filter medium configured to clean the water flowing through the device, and a housing configured to contain the filter media. The housing includes a wall configured to whirl the water flowing through the device to remove from the flow suspended particulates, such as waste from fish or any other solid matter. Water flows into the housing and is turned by the wall to whirl the water about an axis. The water is also exposed to elements held by the media for cleaning the water. The water then flows out of the housing.

By whirling the water flowing through the device, particulates suspended in the flow are thrown toward the wall where the water flows slower because of friction with the wall's surface. As the particulates enter the slower flow, gravity pulls them out of the flow. Some of the particulates might even contact the wall and be further slowed down by friction with the wall's surface. Thus, particulates are removed from the flow of water without the use of filter material that traps suspended particulates. Consequently, the device has less filter material that can clog and require cleaning. And, as discussed elsewhere herein, in some embodiments of the device, the device may be cleaned without having to remove the filter media.

Figure 1:
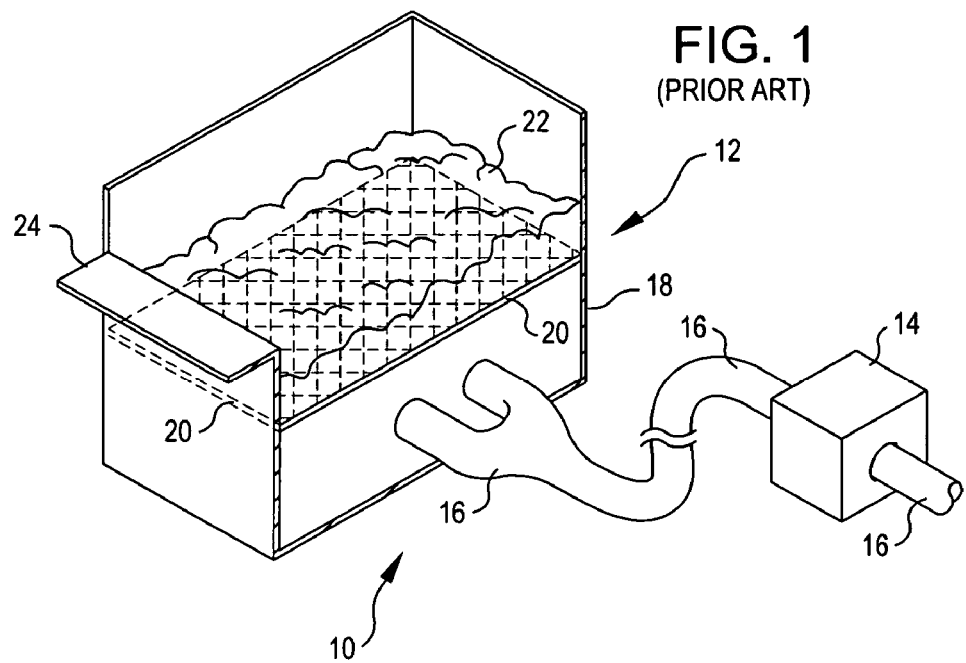
FIG. 1 is a perspective view of a conventional liquid purification device.
Figure 2:
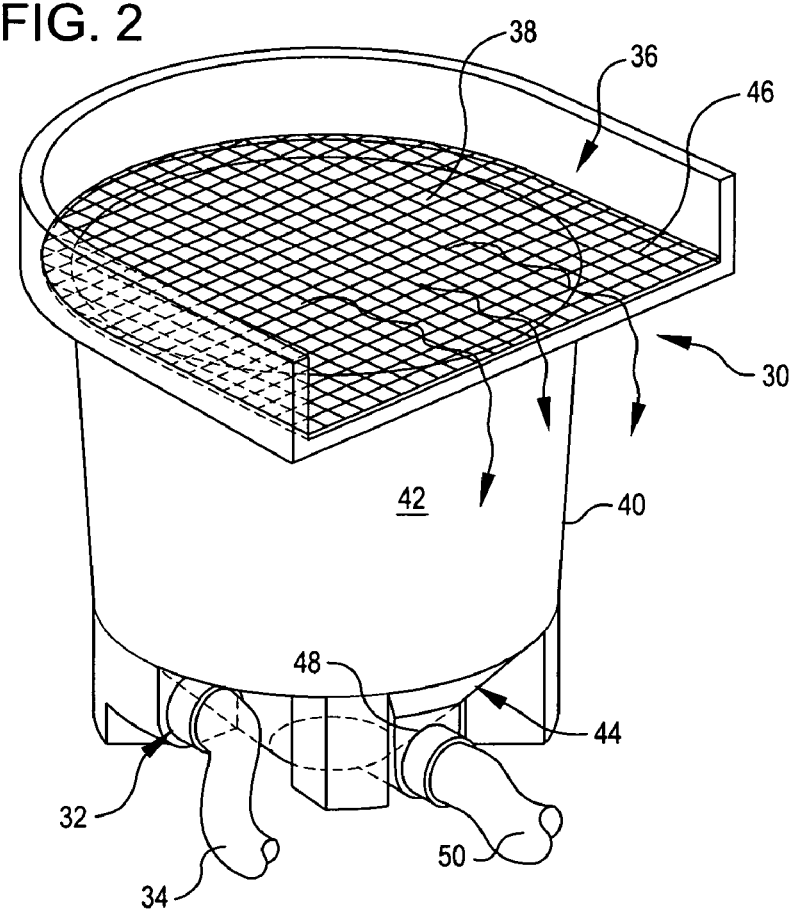
FIG. 2 is a perspective view of a purification device according to an embodiment of the invention.

FIG. 2 is a perspective view of a purification device 30 according to an embodiment of the invention. The device 30 includes an entrance 32 through which a liquid (not shown) enters the device 30 via a hose 34 to be purified, and an exit 36 through which purified liquid leaves the device 30. The liquid can be fresh water like that used in many ponds and residential aquariums; salt water like that used in many commercial aquariums; or any other liquid such as a solvent or oil, that one desires to purify. The device 30 includes a filter medium 38 to clean the liquid flowing through the device 30, and a housing 40 to contain the medium 38. The housing 40 includes a wall 42 (discussed in greater detail in conjunction with FIG. 3) for whirling the flow of liquid to remove suspended particulates (not shown) from the flow.

When the flow is whirled, the momentum of the suspended particulates urges the particulates toward the surface (not shown in FIG. 2 but shown in FIG. 3) of the wall 42 where the liquid flows slower because of friction with the surface. In the slower flow, a force other than the liquid's flow, such as gravity, can remove the particulates from the flow. The momentum of some of the particulates might urge the particulates to contact the wall 42 where the flow is significantly slower, and thus the force that removes the particulate can have a greater effect. In addition, the friction between the particulate and the surface can further reduce the speed of the particulate relative to the wall 42.

By whirling the flow of liquid, suspended particulates can be removed from the flow without the use of filter material that holds the trapped particulates in the flow. Consequently, liquid can flow more easily through the device, and thus less energy is required to move the liquid through the device. Moreover, the device has less filter material that can clog and require cleaning.

Still referring to FIG. 2, the filter medium 38 removes from the flow undesirable products (not shown), such as chemical compounds or elements dissolved in the liquid, that are not easily removed by turning the liquid's flow. For example, the filter medium 38 can convert ammonium ($NH_4$) and organic waste containing nitrogen, such as Urea (($NH_2)_2CO$), into an environmentally safe or usable compound, such as nitrate ($NO_3$).

By cleaning the liquid with a filter medium 38, the device 30 can be used to clean liquids that contain both undesirable particulates and undesirable chemical compounds or elements that have been dissolved by the liquid. Thus, the device 30 can purify a liquid having many different combinations of waste or pollutants. Furthermore, the device 30 can purify many different types of liquids. For example, the device 30 may be used to purify water from an aquarium or pond that includes living animals, such as fish.

Still referring to FIG. 2, the device 30 may also include a trap 44 (discussed in greater detail in conjunction with FIG. 3) to collect the particulates removed from the flow, and a ledge 46 (also discussed in greater detail in conjunction with FIG. 3) to generate a fall with the liquid that leaves the device 30. The trap 44 may include a port 48 that one may open to remove the collected particulates from the trap 44. With the port 48 one can easily clean the device 30 by injecting water into the device 30 through the exit 36. The water can first flow through the filter medium 38 to clean the medium 38, through the housing 40 and trap 44, and then out the port 48 and into a hose 50. As the water flows through the trap 44, the water picks up the collected particulates and carries them with the products removed from the filter medium 38 out the port 48. Thus, the device 30 can be cleaned without having to disassemble it or remove the filter medium 38.

Still referring to FIG. 2, the liquid can be purified by the device 30 by performing the particulate removal and liquid cleansing activities in any order desired. For example, in some embodiments the suspended particulates are first removed from the flow and then the filter medium 38 cleanses the undesirable chemical compounds or elements from the liquid. In other embodiments, the liquid is first cleansed by the filter medium 38 and then the suspended particulates are removed from the flow.

Figure 3:
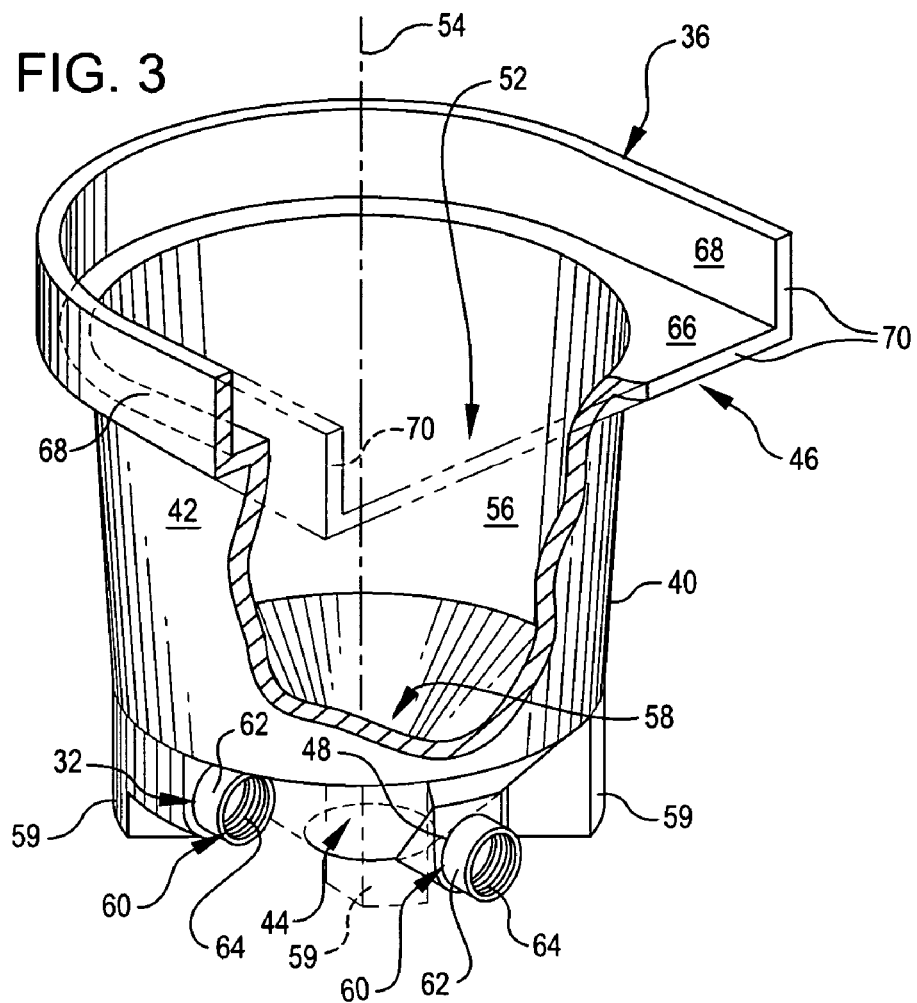
FIG. 3 is a perspective view of a housing included in the device in FIG. 2, according to an embodiment of the invention.

FIG. 3 is a perspective view of the housing 40 in FIG. 2, according to an embodiment of the invention. The housing 40 contains the filter medium 38 (FIG. 2) and includes a chamber 52 in which the flow is whirled by the wall 42.

The chamber 52 may be any shape desired, and the wall 42 may be disposed in the interior of the chamber 52 or may define the chamber 52. For example, in some embodiments the wall 42 surrounds a portion of an axis 54 and includes an interior surface 56 that defines the chamber 52 as cylindrical. The entrance 32 is located at an end 58 of the chamber 52 and positioned to direct the flow into the chamber 52 in a substantially tangential direction to the surface 56. When the liquid enters the chamber 52, the liquid flows parallel to the surface 56. As the liquid continues into the chamber 52, the surface 56 of the wall 42 turns the flow (not shown) and directs the flow along a curved circular path defined by the surface 56. As the flow revolves about the axis 54, the flow travels toward the filter media 38 (FIG. 2) and suspended particulates are thrown toward the surface 56 of the wall 42 and removed from the flow. In some embodiments, the wall comprises or forms a surface that projects or otherwise hinders the flow of water to create a venturi effect or other pressure differential such that particulates can accumulate or otherwise be extracted from the water in front of or after the projection.

In some embodiments the flow may revolve to make at least one complete revolution around the axis 54 and then contact the filter media 38. In other embodiments, the flow may revolve to make less than one complete revolution or more than one complete revolution, such as two or any other number, around the axis 54 before contacting the filter media 38. In addition, some embodiments may include a chamber 52 having an oval, octagonal, or square shape that is defined by the interior surface 56 of the wall 42. Other embodiments may include a chamber 52 having any desired shape and in which the flow-turning wall 42 is disposed, like an interior baffle in a water tank.

In some embodiments, the chamber 52 may include more than one wall for whirling the flow. In other embodiments, the housing 40 may include more than one chamber 52 and/or more than one entrance 32.

Still referring to FIG. 3, the housing 40 may also include a trap 44 to collect the particulates removed from the flow, and a support to support the housing in an upright position. For example, in some embodiments the trap 44 may be a cone that extends from the end 58 of the chamber 56 to hold the particulates removed from the flow, and the support may be four legs 59 that also extend from the end 58. The cone may be located below the entrance 32 to keep the particulates away from the liquid flowing through the chamber 56 toward the filter medium 38. By keeping the particulates away from the flow, the particulates don't interfere with the flow, and thus allow the liquid to more easily flow through the chamber 52. The trap 44 includes a port 48, which may be located at the bottom of the cone, which one can open to remove the particulates from the trap 44. To clean the trap 44, one can open the port 48, add liquid to the chamber 52, and allow some or all of the liquid to drain through the port 48 and carry the particulates out of the trap 44.

The entrance 32 and port 48 each may include any desired components capable of coupling, releasably or not, a hose, such as the hoses 34 and 50 in FIG. 2, or a pipe (not shown) to the entrance 32 or port 48. For example, in some embodiments the entrance 32 and port 48 each include an insert 60 that may be fixed or releasably attached to the entrance 32 or port 48. The inserts 60 include a flange 62 having a threaded region 64 that is sized to receive and engage corresponding threads (not shown) of a connector (not shown) of the pipe or hose. Thus, the pipe or hose may be releasably coupled to the entrance or port to allow one to connect the device 30 (FIG. 2) to a liquid circuit to purify liquid contained in the circuit. Then, when the purification is completed, one can release the device 30 from the circuit and connect the device 30 to another circuit to purify the liquid in the other circuit.

Still referring to FIG. 3, the housing 40 may include a ledge 46 to generate a fall with the liquid that leaves the device 30. A fall may be desirable when purifying water in a pond or aquarium to add oxygen from the air to the liquid or to provide a soothing sound for some to enjoy. In some embodiments, the ledge 46 has a substantially flat section 66 that the liquid flows over before leaving the ledge 66, and two sidewalls 68 to confine the liquid to flowing over the flat section 66. The substantially flat section 66 and two side walls 68 each have an edge 70 for attaching a barrier (not shown) to prevent the falling liquid from leaving the liquid circuit. To attach the barrier, a gasket (not shown) is inserted between the edge 70 and the barrier, and one or more fasteners, such as bolts and nuts fasten the barrier, gasket and edge 70 together. By extending the edge 70 up each sidewall 68, the gasket can seal the interface between the barrier and each sidewall 68, and thus prevent liquid from escaping around the edge 70 of the flat section 66.

Other embodiments are possible. For example, the housing may include an aperture that is similar in size and shape to the entrance 32, but that functions as the exit of the device. The exit in this embodiment may include any desired components capable of coupling, releasably or not, a hose, such as the hoses 34 and 50 in FIG. 2, or a pipe (not shown) to the exit. For example, in some embodiments the exit may include an insert that may be fixed or releasably attached to the exit.

Referring to FIGS. 2 and 3, in some embodiments, the device 30 (FIG. 2) operates as follows. Liquid to be purified enters the device 30 through the entrance 32 (FIGS. 2 and 3). The liquid flows into the chamber 52 (FIG. 3) where the surface 56 (FIG. 3) of the wall 42 (FIG. 3) turns the flow to whirl the liquid and thus urge suspended particulates toward the surface 56. As the particulates approach the surface 56, gravity pulls them out of the flow toward the trap 44 (FIG. 2). The liquid revolves about the axis 54 (FIG. 3) away from the trap 44 and toward the filter medium 38 (FIG. 2). The filter medium 38 removes undesirable products from the liquid that were not removed in the chamber 52. The liquid then flows out the exit 36 (FIGS. 2 and 3) and over the ledge 46 (FIGS. 2 and 3). To clean the device 30, one closes the entrance 32, opens the port 48 (FIGS. 2 and 3) and injects liquid into the housing 40 through the exit 36. The injected liquid carries undesirable products trapped in the filter medium 38 and the particulates held in the trap 44 out the port 48.

In other embodiments, forces generated from other phenomena, such as magnetism and electricity, may be used to remove particulates from the flow.

Figure 4:
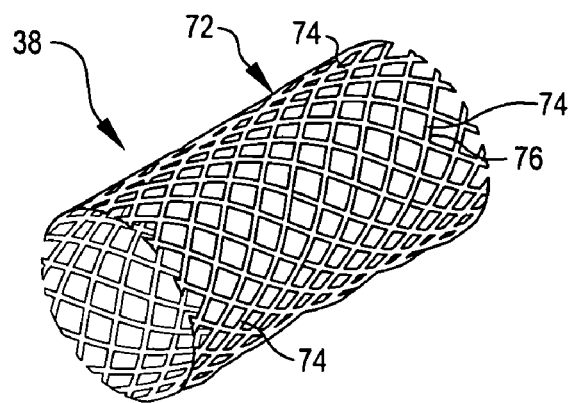
FIG. 4 is a perspective view of a filter medium included in the device in FIG. 2, according to an embodiment of the invention.

FIG. 4 is a perspective view of the filter medium 38 in FIG. 2, according to an embodiment of the invention. The filter medium 38 cleans the liquid (not shown) by removing undesirable products (not shown) that are not easily removed by turning the liquid's flow (not shown), such as chemical compounds or elements dissolved in the liquid. The filter medium 38 cleans the liquid by placing in the flow one or more living organisms, such as bacteria, that consume the undesirable products, or one or more chemical elements or compounds that react with the undesirable products. The medium 38 can place the organisms, elements or compounds in the liquid by releasing them into the flow to be carried by the flow as they consume or react the undesirable products, by holding onto them as the liquid flows through the medium, or by both releasing and holding on to the organisms, elements or compounds.

The filter medium 38 can be any shape desired. For example, in some embodiments the medium 38 may include one or more nets 72 in the shape of a sleeve that allows a large amount of open space for liquid to flow even when crumpled up. Each net 72 includes strands 74 (only four labeled for clarity) connected together to form the net 72. Each strand 74 includes a surface 76 that contacts liquid when the liquid flows through the net 72. The surface 76 provides a place where useful bacteria can remain in the medium 38 as liquid flows through the medium 38. The bacteria convert ammonium ($NH_4$) and organic waste containing nitrogen, such as Urea (($NH_2)_2CO$), into an environmentally safe or usable compound, such as nitrate ($NO_3$).

Each strand 74 may be any desired length and size, and the net 72 may have any desired number of strands 74, to provide the medium 38 a specific surface area (SSA). A medium's SSA is a measure of the medium's cleansing efficiency and indicates the amount of area that the medium can expose to the liquid. Thus, increasing a medium's SSA increases the amount of organisms, elements or compounds that the medium can release into or hold in the liquid flowing through the medium.

The SSA of the medium 38 may be any desired SSA. For example, in some embodiments the SSA may be greater than 250 square feet per cubic foot, such as 366 $ft^2/ft^3$. To increase the medium's SSA without changing the net's strand density and one or more of the strand's size and length, the net 72 may be crumpled with one or more other nets and then disposed in the housing 40.

Still referring to FIG. 4, the filter media 38 can be made of any desirable material capable of performing the medium's function. For example, in some embodiments the material of the medium 38 may be polyethylene. If the liquid being purified is a liquid, such as water, that has a density greater than polyethylene, then the medium 38 can float on the liquid. This may be desirable when the device 30 (FIG. 2) is used with the filter medium 38 located in the chamber 52 (FIG. 3) and opposite the end 58 (FIG. 3), because a grill or screen would not be required to keep the medium 38 out of the regions of the chamber 52 where the medium 38 could adversely affect the suspended particulates' removal. Without a grill or screen, the liquid can more easily flow through the device 30.

Figure 5:
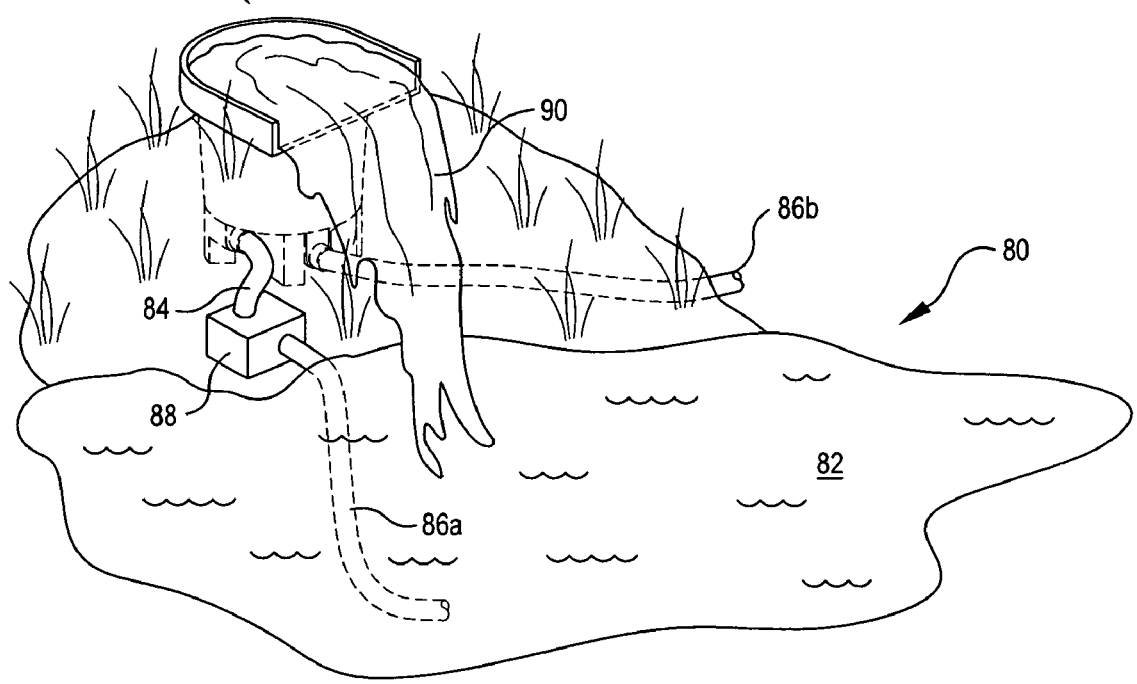
FIG. 5 is a perspective view of a pond that includes the device in FIG. 2, according to an embodiment of the invention.

FIG. 5 is a perspective view of a water garden pond 80 that includes the device 30 in FIG. 2, according to an embodiment of the invention. The pond 80 includes a basin 82 that contains water, fish and plants. The pond 80 also has a water purification circuit 84 that includes the device 30 to purify the water, pipes 86a and b that couple the basin 82 to the device 30 and carry the water from the basin 82 to the device 30, and a pump 88 to move the water through the device 30. The device 30 includes the housing 40 (FIG. 3) that has a ledge 46 adjacent the exit 36 to generate a waterfall 90 and a trap 44 (FIG. 3) with a port 48 (FIG. 3). Pipe 86b is connected to the port 48 to allow one to clean the device 30 without moving the device 30, and thus easily clean the device 30.

Other embodiments are possible. For example, the device may be used in an aquarium. The device may also be releasably coupled to the pipes 86a and b of the purification circuit and thus may be mobile. This may be desirable when the water in one or more ponds require cleaning at different times. The pond 80 may also include more than one device 30 to purify the pond's water, or may include other types of purification devices to purify the pond's water in conjunction with the device 30.

The scope of the present systems and methods, etc., includes both means plus function and step plus function concepts. However, the terms set forth in this application are not to be interpreted in the claims as indicating a "means plus function" relationship unless the word "means" is specifically recited in a claim, and are to be interpreted in the claims as indicating a "means plus function" relationship where the word "means" is specifically recited in a claim. Similarly, the terms set forth in this application are not to be interpreted in method or process claims as indicating a "step plus function" relationship unless the word "step" is specifically recited in the claims, and are to be interpreted in the claims as indicating a "step plus function" relationship where the word "step" is specifically recited in a claim.

From the foregoing, it will be appreciated that, although specific embodiments have been discussed herein for purposes of illustration, various modifications may be made without deviating from the spirit and scope of the discussion herein. Accordingly, the systems and methods include such modifications as well as all permutations and combinations of the subject matter set forth herein and are not limited except as by the appended claims.

What is claimed is:

1. A water garden filter device sized and configured for purifying water of a water garden or fish pond, the device comprising:
    a filter medium configured to clean the water flowing through the device; and
    a housing configured to contain the filter media, and including:
        a wall configured to whirl the water flowing through the device to remove suspended particulates from the flow due to impact of the water with the wall;
        a trap configured to collect the removed particulates,
        an entrance configured to permit water to flow into the housing, the entrance disposed below the filter media and below the wall that is configured to whirl water flowing through the device; and
        an exit configured to permit water to flow out of the housing, the exit including a ledge configured to generate a waterfall from water flowing out of the exit.

2. The device of claim 1 wherein the device is configured such that the wall whirls the water before the water contacts the filter media.

3. The device of claim 1 wherein the filter media is configured to convert organic waste into nitrate.

4. The device of claim 1 wherein the filter media is configured to hold bacteria that converts organic waste into nitrate.

5. The device of claim 1 wherein the filter media has a specific-surface-area greater than 250 square feet per cubic foot.

6. The device of claim 1 wherein the filter media includes polyethylene netting.

7. The device of claim 1 wherein the entrance is configured such that the liquid enters the housing perpendicular to a radius of the housing.

8. The device of claim 1 wherein the device is configured such that the wall generates a circular flow of water.

9. The device of claim 1 wherein the device is configured such that the water flow makes at least one complete revolution around an axis.

10. The device of claim 1 wherein the ledge includes a flat section over which water exiting the housing flows.

11. The device of claim 1 wherein the trap includes a port through which particulates can be moved to remove the particulates from the housing.

12. The device of claim 1 wherein the device is configured to be substantially maintained underground and the housing includes at least one leg to support the housing in an upright position.

13. A system for purifying water of a water garden or fish pond, the system comprising:
 a pump configured to generate a flow of water; and
 a water garden filter device configured to purify the water and including:
  a filter medium configured to clean the water flowing through the device; and
  a housing configured to contain the filter media, and including:
   a wall configured to whirl the water flowing through the device to remove suspended particulates from the flow due to impact of the water with the wall;
   a trap configured to collect the removed particulates,
   an entrance configured to permit water to flow into the housing, the entrance disposed below the filter media and below the wall that is configured to whirl water flowing through the device; and
   an exit configured to permit water to flow out of the housing, the exit including a ledge configured to generate a waterfall from water flowing out of the exit.

14. The system of claim 13 wherein the filter media is configured to convert organic waste into nitrate.

15. The system of claim 13 wherein the trap includes a port through which particulates can be moved to remove the particulates from the housing.

16. A method for purifying water in a water garden or fish pond, the method comprising:
 directing a flow of the water through an entrance into a chamber of a water garden filter device;
 whirling the water in the chamber to remove suspended particulates from the flow, wherein the water in the chamber whirls above the entrance;
 trapping the particulates removed from the flow;
 providing filter media in the chamber, wherein the filter media is disposed above the entrance;
 cleaning the water with the filter media; and
 expelling the flow of water over a ledge of an exit of the device to generate a waterfall.

17. The method of claim 16 wherein whirling the water in the chamber includes generating a flow that revolves around an axis of the chamber.

18. The method of claim 17 wherein the flow revolves at least one complete revolution around the axis of the chamber.

19. The method of claim 16 wherein cleaning the water includes converting organic waste into nitrate.

20. The method of claim 16 wherein cleaning the flow includes:
 disposing bacteria on the filter media, and
 the bacteria converting organic waste into nitrate.

21. The method of claim 16 wherein the wall whirls the water before the filter media cleans the water.

22. The method of claim 16 further comprising moving the trapped particulates through a port to remove the particulates from the chamber.

23. The method of claim 16 wherein expelling the flow of water over the ledge includes water flowing over a flat section of the ledge.

24. The method of claim 16 further comprising cleaning the filter media while the media remains contained in the device.

25. The method of claim 24 wherein cleaning the filter media includes directing a second flow of liquid through the filter media, wherein the second flow flows through the exit of the device before the second flow contacts the filter media.

* * * * *

(12) EX PARTE REEXAMINATION CERTIFICATE (9308th)
United States Patent
Russell

(10) Number: US 7,425,268 C1
(45) Certificate Issued: Sep. 18, 2012

(54) DEVICE AND RELATED METHODS FOR PURIFYING A LIQUID

(75) Inventor: John A. Russell, Redmond, WA (US)

(73) Assignee: R. W. Distributing, Inc., Redmond, WA (US)

Reexamination Request:
No. 90/011,658, Jun. 3, 2011

Reexamination Certificate for:
Patent No.: 7,425,268
Issued: Sep. 16, 2008
Appl. No.: 11/331,654
Filed: Jan. 13, 2006

Related U.S. Application Data

(60) Provisional application No. 60/676,039, filed on Apr. 29, 2005.

(51) Int. Cl.
*C02F 3/06* (2006.01)

(52) U.S. Cl. .................... 210/617; 210/150; 210/167.22; 210/167.25; 210/170.02; 210/512.1; 210/618; 210/747.1; 210/788

(58) Field of Classification Search .................. None
See application file for complete search history.

(56) References Cited

To view the complete listing of prior art documents cited during the proceeding for Reexamination Control Number 90/011,658, please refer to the USPTO's public Patent Application Information Retrieval (PAIR) system under the Display References tab.

*Primary Examiner* — Sean E Vincent

(57) ABSTRACT

In an aspect of the invention, a device for purifying water in a water water garden or fish pond comprises a filter medium configured to clean the water flowing through the device, and a housing configured to contain the filter media. The housing includes a wall configured to whirl the water flowing through the device to remove suspended particulates from the flow. Liquid flows into the housing, is turned by the wall to whirl the water about an axis, and exposed to elements held by the filter medium for cleaning the liquid. The liquid then flows out of the housing. Cleaning the medium is performed by opening a drain port and adding water to the chamber.

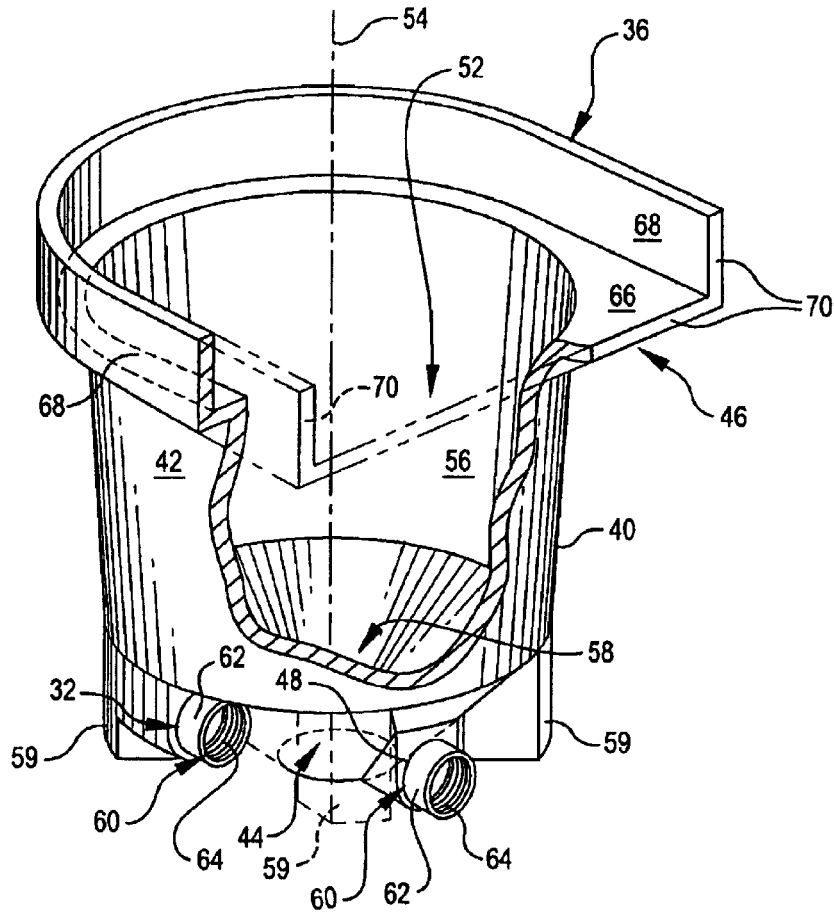

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-15 is confirmed.

Claim 16 is determined to be patentable as amended.

Claims 17-25 dependent on an amended claim, are determined to be patentable.

New claims 26-30 are added and determined to be patentable.

16. A method for purifying water in a water garden or fish pond, the method comprising:
    directing a flow of the water through an entrance into a chamber of a water garden filter device, *wherein the entrance is disposed below a wall configured to whirl the water flowing through the chamber to remove suspended particulates from the flow due to impact of the water with the wall*;
    whirling the water in the chamber to remove suspended particulates from the flow, wherein the water in the chamber whirls above the entrance;
    trapping the particulates removed from the flow;
    providing filter media in the chamber, wherein the filter media is disposed above the entrance;
    cleaning the water with the filter media; and
    expelling the flow of water over a ledge of an exit of the device to generate a waterfall.

26. *The device of claim 1 wherein:*
    *the filter media may be cleaned by a second flow of fluid while the media remains contained in the device;*
    *wherein the second flow flows through the exit of the device before the second flow contacts the filter media; and*
    *wherein the wall configured to whirl water extends vertically and continuously from the trap to the exit to permit cleaning of the wall by the second flow.*

27. *The device of claim 1 wherein the wall is configured to whirl water extends vertically and continuously from the trap to the exit to permit cleaning of the wall by a second flow.*

28. *A water garden filter device sized and configured for purifying water of a water garden or fish pond, the garden filter device comprising:*
    *a housing configured to contain a filter media, and including within the housing:*
        *a substantially vertical wall configured to whirl the water flowing through the device to remove suspended particulates from the flow due to impact of the water with the wall;*
        *bacterial filter medium configured to clean the water flowing through the device;*
        *a water entrance configured to permit water to flow into the housing, the entrance disposed below the filter media and below the wall that is configured to whirl water flowing through the device from the entrance to the filter medium;*
        *a trap in a lower portion of the housing, the trap configured to collect particulates;*
        *an exit configured to permit water to flow out of the housing, the exit including a substantially flat and level ledge configured to generate a waterfall from water flowing out of the exit; and*
        *a trap port substantially at the same vertical position as the water entrance, the trap port openable to allow backflushing of the filter medium, housing, and trap by directing a second flow of liquid through the exit toward the filter medium, therefrom through the housing, therefrom through the trap, and therefrom through the trap port.*

29. *A water garden filter device sized and configured for purifying water of a water garden or fish pond, the device comprising:*
    *a filter medium configured to clean the water flowing through the device; and*
    *a housing configured to contain the filter media, and including:*
        *a wall configured to whirl the water flowing through the device to remove suspended particulates from the flow due to impact of the water with the wall;*
        *a trap configured to collect the removed particulates,*
        *an entrance configured to permit water to flow into the housing, the entrance disposed below the filter media and configured such that the water whirled by the wall whirls above the entrance; and*
        *an exit configured to permit water to flow out of the housing, the exit including a ledge configured to generate a waterfall from water flowing out of the exit.*

30. *The device of claim 29 further comprising a trap port substantially at the same vertical position as the water entrance, the trap port openable to allow backflushing of the filter medium, housing, and trap by directing a second flow of liquid through the exit toward the filter medium, therefrom through the housing, therefrom through the trap, and therefrom through the trap port.*

\* \* \* \* \*